Figure 4:
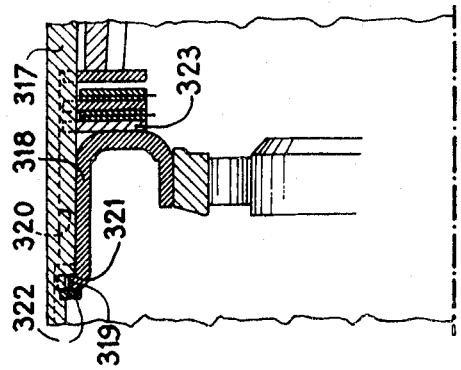

United States Patent [19]

Piret

[11] 3,741,037
[45] June 26, 1973

[54] HYDRAULICALLY CONTROLLED PLANETARY GEAR

[75] Inventor: Jean Piret, Bougival, France

[73] Assignees: Automobiles Peugeot, Paris, Regie Nationale Des Usines Renault, Billancourt, both of France

[22] Filed: June 21, 1971

[21] Appl. No.: 154,765

[30] Foreign Application Priority Data
June 24, 1970 France .............................. 7023348

[52] U.S. Cl. .................................... 74/763, 74/789
[51] Int. Cl. ............................................ F16h 57/10
[58] Field of Search .................... 74/759, 763, 789; 184/6.12; 192/48.4, 113

[56] References Cited
UNITED STATES PATENTS

| | | | |
|---|---|---|---|
| 3,162,063 | 12/1964 | Konrad .............................. | 74/763 |
| 3,509,784 | 5/1970 | Mahoney ............................ | 74/759 |
| 3,339,431 | 9/1967 | Croswhite et al. ................... | 74/763 |
| 3,038,353 | 6/1962 | Roche ................................ | 184/6.12 |
| 3,424,031 | 1/1969 | Stockton ............................ | 74/759 |
| 3,523,468 | 8/1970 | Kepner ............................. | 74/759 |
| 2,536,861 | 1/1951 | Weeks et al. ....................... | 74/789 |
| 3,605,946 | 9/1971 | Oehl ................................ | 184/6.12 |
| 2,747,433 | 5/1956 | Forster ............................. | 192/48.4 |
| 3,207,280 | 9/1965 | Dangauthier ....................... | 192/113 |

Primary Examiner—Arthur I. McKeon
Assistant Examiner—G. P. LaPointe
Attorney—Burns, Doane, Swecker & Mathis

[57] ABSTRACT

Automatic hydraulically controlled planetary gear transmission in which two clutch devices and one of the holding devices are disposed concentrically at one end of the transmission. The planetary gear mechanism is disposed at the opposite end of the transmission. The transmission has a middle part in which are arranged in a common radial plane in this order : a centre shaft, a hollow layshaft rotatable on the centre shaft, a freewheel hub rotatable on the layshaft and connected to rotate with the planet gear carrier, means for locking the freewheel, a freewheel outer ring and an annular member. The latter is integral with the transmission case and with the freewheel outer ring and at least partly defines a cylinder receiving the piston actuating the adjacent holding device.

11 Claims, 4 Drawing Figures

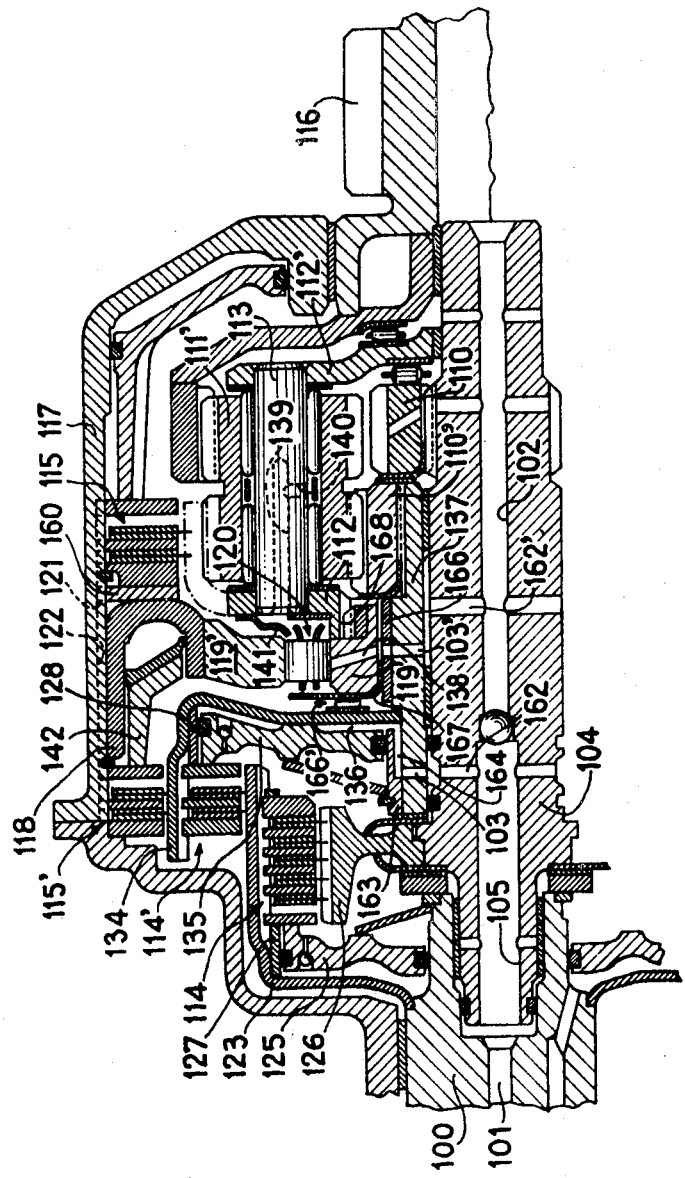

HYDRAULICALLY CONTROLLED PLANETARY GEAR

The present invention relates to planetary gear (epicyclic) transmissions hydraulically controlled automatically.

It is known that automatic transmissions usually comprise centre bearings integral with the case of the transmission. Such a bearing supports the plane-gear carrier of the planetary gear train and conveys the fluid under pressure to one or more rotating brakes and clutches. This centre bearing also acts as a reaction for the transmission of the torque from the free-wheel and is sometimes employed for transmitting the oil which lubricates the various parts of the transmission.

Such an arrangement having a centre bearing which is in one piece with or secured to the case has numerous drawbacks. The thickness of the transverse partition wall created thereby is considerable and substantially increases the axial size of the transmission. It is a relatively expensive part since it is often constructed from treated steel. Usually, it is necessary to construct the layshaft which extends through this partition wall in two parts and this is also a costly arrangement. Further, in direct drive, bearing in mind that when the planetary gear carrier rotates it drives the outer ring of the freewheel, there is a frictional loss between this ring and the centre bearing. It might also be mentioned that the supply of hydraulic liquid to the clutches is via this centre bearing and this requires numerous sealing means and lengthens the oil supply path.

To decrease the longitudinal size and the weight of the centre bearing and consequently that of the transmission, bearings have been proposed which consist of two metal sheets which define therebetween a fluid chamber with which the lubricating passages for the various elements of the transmission communicate. Such an arrangement is described in French Patent Application No. 7,003,902 filed by the applicant on Feb. 4, 1970. In this patent application, one of the sheets constituting the centre bearing is integral with the hub of the freewheel whose outer ring is welded to the planet gear carrier of the planetary gearset.

The central bearing constituted by two sheets has a relatively high cost price even though it is substantially cheaper than a centre bearing forming part of the case. Such an arrangement does not remedy all the drawbacks mentioned.

An object of the present invention is to provide a hydraulically-controlled planetary gear transmission which is smaller in the axial and radial directions and does not have the aforementioned drawbacks of prior arrangements, in particular as concerns cost.

The invention provides an automatic hydraulically controlled planetary gear transmission of the type comprising two clutch devices and two holding or brake devices the selective actuation of which determines the gear ratio of the transmission, wherein the two clutch devices and one of the holding devices are disposed concentrically at one end of the transmission and the planetary gear mechanism is located at the other end of the transmission, the middle part of the transmission comprising roughly in a common radial plane, in the order from the interior toward the exterior : a centre shaft, a hollow layshaft rotatably mounted on the centre shaft, a freewheel hub rotatably mounted on the hollow shaft and connected to rotate with the planet gear carrier of the planetary gear mechanism, means for locking the freewheel, the outer ring of the freewheel, and an annular member integral with the transmission case and with said outer ring and at least partly defining a cylinder receiving the piston controlling the adjacent holding device.

With this arrangement, it is possible to reduce the axial length of the transmission and decrease the cost of the transmission, since the transverse partition wall of known devices is eliminated.

The supply of hydraulic fluid to the clutch devices and the lubrication of the various elements of the transmission, such as the freewheel and the planet gears, is achieved by way of an axial conduit formed in the centre shaft and through radial apertures in the centre shaft and in the hollow layshaft. A partly hollowed ring is provided around the hollow shaft for conveying the hydraulic fluid, said ring also serving as a bearing face for the piston controlling the clutch. As will be mentioned in the ensuing description, the presence of such a ring also contributes to decrease the axial size of the middle part of the transmission.

Further, the pistons controlling the clutches of a planetary gearset usually have a cylindrical bearing face provided with a sealing element which moves axially in a bore defined by the inner wall of the clutch drum. Now, this drum also has a splined portion of larger diameter engaging the clutch discs and the region of connection between the cylindrical portion and the splined portion constitutes a "lost" region which unnecessarily increases the axial size of the assembly. In order to retain for the pistons controlling the clutches their calculated travel or stroke while reducing the axial sizes of the drums, the invention proposes employing a sleeve attached to the bore of the clutch drum whose inner wall defines the bearing face for the piston controlling the clutch. This feature also enables the axial size of the transmission to be reduced.

Further features and advantages of the invention will be apparent from the ensuing description with reference to the accompanying drawings. It must be understood that changes may be made to the constructional details and to the arrangement of the component parts whose preferred form is shown merely by way of example.

Figure 3:
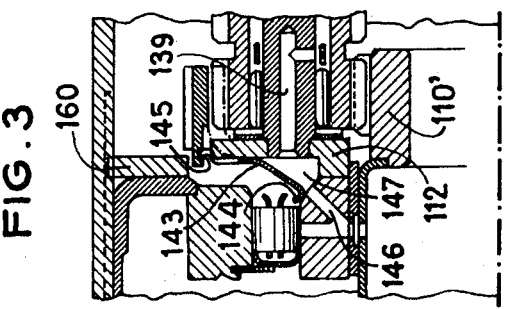
Figure 2:
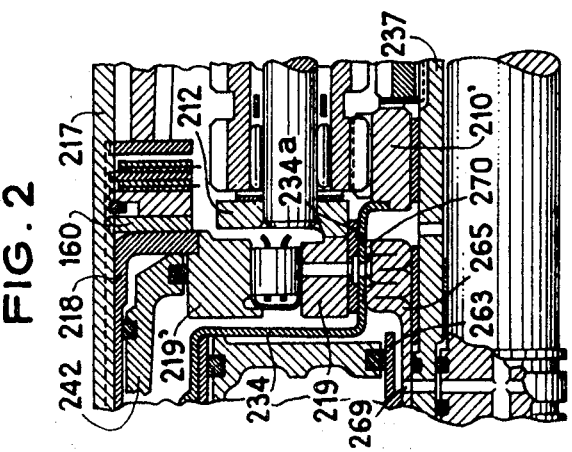

In the drawings :

FIG. 1 is a longitudinal sectional view of one embodiment of a hydraulically-controlled planetary gear transmission according to the invention, and FIGS. 2–4 are partial longitudinal sectional views of modifications of the transmission according to the invention.

FIG. 1 shows the planetary gearset which comprises, as described in the aforementioned patent, a plurality of elements including two sun gears 110, 110' and two sets of planet gears of different lengths only one of which has been shown which is a long planetary gear 111' rotatably mounted on a shaft 113 disposed between the two end walls 112, 112' of the planet gear carrier. Clutch devices 114, 114' and holding or brake devices 115, 115' and a freewheel 120 enable three forward speeds and a reverse speed to be transmitted to the output shaft 116 of the transmission.

The clutches 114, 114' and the brake 115' are arranged substantially concentrically in the left part of the transmission case as viewed in FIG. 1, and the planetary gearset mechanism is located in the right part.

The clutch drums of pressed sheet metal 123 and 134, which have their open sides facing each other, are provided in their portion of reduced diameter with an attached sleeve 127 and 128 which constitutes a bearing face for the associated control piston 125,135. The presence of such a sleeve enables this portion of the drum to be shortened, this portion usually serving as a direct support face for the piston and economizing in particular the length of the connection region between the portions of different diameters of the drum, which region is usually lost.

The fixed outer ring 119' of the freewueel is integral with the cylinder 118 receiving the control piston 142 of the holding device 115'.

In FIGS. 1 and 2 the cylinder 118, 218 is prevented from rotating by a sheet metal disc 160 to which the cylinder 118, 218 is welded. The disc 160 carries on its periphery teeth 121 which are engaged in grooves 122 in the case 117, 217 of the transmission and adapted to act as reaction abutments when the torque is transmitted.

In FIG. 1, the annular element 118 has a U-shaped section of which the outer branch is slightly longer than the inner branch each of these two branches defining a cylindrical bearing face for the piston.

The clutch 114' is supplied with hydraulic fluid via the following path : an axial conduit 101 formed in the input shaft 100 of the transmission, an axial conduit 105 formed in the shaft 104 integral with the hub 126 of the clutch 114, and radial conduits 162, 103 respectively formed in the centre shaft and in the hollow shaft 137.

In order to reduce the axial size, the input aperture for the fluid 103 communicates with a ring 163 which is hollowed in a part of its length so as to define an axial conduit 164 supplying fluid to the chamber 136. Owing to this arrangement, the axial clearance necessary between the end of the ring 163 and the end face of the drum 134 can be very small, whereas the section of the passage for fluid remains sufficient since it is distributed over the whole of the periphery of the ring. Consequently, the piston 135, and in particular its support adjacent the axis, can come very near to the end of the drum 134, which would be impossible if, as in known arrangements, the radial conduit 103 communicated directly with the chamber 136. Thus there is achieved a reduction in the axial size of the transmission.

In the embodiment shown on FIG. 1, the rotating hub 119 of the freewheel is journalled on the hollow rotating shaft 137 by means of an antifriction member 166. It is also integral with an antifriction washer 166' secured to a notched sheet 167 whose notches (not shown) engage in the hub 119. It can be seen that this arrangement enables the hub 119 to be held laterally and substantially reduces the axial size of the mechanism.

The hub 119 of the freewheel is integral with the end wall 12 which is a part of the planet gear carrier of the planetary gearset. The wall 112 carries inner teeth 168 which are adapted to permit the assembly of the unit comprising the hub 119, the hollow shaft 137 and the sun gear 110' concentrically with the planet gear carrier when the outside diameter of the sun gear is larger than the inside diameter of the planet gear carrier.

The number of teeth can be, for example, equal to that of the gear 110'.

The fluid lubricating the freewheel and the planet gears is supplied through a path comprising, starting with the axial conduit 102 of the centre shaft 104, radial passages 162' and 103' formed in the centre shaft and in the hollow shaft 137, radial passages 138 formed in the hub of the freewheel and passages 139 and 140 formed in the planet gear carrier itself. A deflecting sheet 41 secured to the wall 112 (FIG. 1) facilitates the passage of this fluid towards the planet gear carrier.

This arrangement is improved in the modification shown in FIG. 3 which shows that member 143 of pressed sheet metal is so shaped as to clip onto a chamfered portion 144 provided on the lateral extension of the hub of the freewheel and in a groove 145 provided on the wall 112. Owing to the presence of this member, the oil supplied by way of the passage 146 is put under pressure in the chamber 147 under the effect of centrifugal force and it is urged towards the conduits 139 and thus improves the lubrication of the planet gears and contributes to the reliability and life of the transmission.

In the embodiment shown in FIG. 2, where elements corresponding to those shown in FIG. 1 carry reference numbers increased by 100, it will be observed that there are two important modifications. First, the ring 163 which was carried by the hollow shaft 137 is carried by an intermediate element 165 of folded sheet metal having two passages 269, 270 for the clutch oil and lubricating oil. Further, the clutch drum 234 has an extension 234a directly secured to the sun gear 210' and the hub 219 is welded to the end wall 212 of the planet gear carrier. The other modification concerns the manner in which the cylinder receiving the piston 242 actuating the corresponding brake 119' is constructed. This cylinder is defined partly by an annular member 218 having an L-shaped section and partly by the outer wall of the ring of the free wheel 219'. This arrangement may have the advantage of giving to this ring larger dimensions and thus increasing its strength.

FIG. 4 shows a modification in the assembly of the annular member, such as 318, which defines at least a part of the cylinder receiving the brake control piston. This arrangement aims at reducing still more the axial size by eliminating in particular the toothed ring 160 shown in FIG. 1. For this purpose, the member 318 has a flange 319 which extends radially and outwardly, this flange being toothed and co-operating with grooves or splines 320 provided in the case 317 for preventing the cylinder 318 and the outer ring of the freewheel from rotating.

Further, in abutting against an annular shoulder 321 on the case, the flange 319 also holds the cylinder 318 in one axial direction, the flange being hold in the other direction by a ring 322. Thus, the ring 160 and one of the two rings or circlips shown in FIG. 1 are eliminated. Moreover, this arrangement permits a substantial reduction in the axial thickness of the brake plate 323 which bears against the end wall of the member 318.

The essential advantages of an automatic transmission arranged in accordance with the invention are the following :

Optimum occupation of the available space and in particular reduction in the axial overall size in particular owing to the elimination of the centre partition wall constituting a bearing and to the mounting of the piston in the clutch drum through the medium of a sleeve 128 and a ring 163 and to the mounting of the member 318 receiving the piston actuating one of the holding or brake devices.

Improved pressure lubrication of the moving parts of the transmission owing to the supply of lubricant from the centre of the transmission and to the utilization of centrifugal force.

Elimination of frictional losses in the third speed position of the transmission, bearing in mind that for this speed ratio, the planet gear carrier, the freewheel hub and the adjacent hollow shaft rotate together at the same speed.

It has been mentioned hereinbefore that the transmission was controlled hydraulically but it must be understood that the control device, and in particular the automatic selecting device and certain regulating elements may comprise electrical and/or electronic components.

Having now described my invention what I claim and desire to secure by Letters Patent is :

1. An automatic hydraulically controlled planetary gear transmission comprising a case, an input shaft and an output shaft coaxial with the input shaft, a planetary gear mechanism comprising two sun gears, planet gears carried by a planet gear carrier and a ring gear connected to the output shaft, a first brake means between paid planet gear carrier and the case and actuating means therefor, a first drum member connected to said input shaft, a first hub member integral with or fixed to an intermediate shaft coaxial with said input and output shafts and carrying one of said sun gears, a first clutch device between said first drum member and said first hub member, fluid operated piston and cylinder means for actuating said first clutch device, a second drum member integral with or fixed to a hollow shaft member coaxial with and rotatably mounted on said intermediate shaft and carrying a second of said sun gears, said second drum member extending at least partly around said first drum member, a second clutch device between said first and second drum members, fluid operated piston and cylinder means for actuating said second clutch means, second brake means between said second drum member and said case and a fluid operated piston and cylinder unit for actuating said second brake means, the two drum members, the two clutch devices and said second brake means being disposed concentrically at a first end of the transmission and the planetary gear mechanism and the first brake means being located concentrically at a second end of the transmission, the transmission having a middle part comprising radially from the interior toward the exterior of the transmission : said intermediate shaft, said hollow shaft rotatably mounted on the intermediate shaft, a free wheel device having a freewheel hub rotatably mounted on the hollow shaft and connected to rotate with the planet gear carrier, locking members, and a freewheel outer ring, and an annular member integral with or fixed to the transmission case and to said outer ring and at least partly defining the cylinder of the piston and cylinder unit for actuating said second brake device.

2. A transmission as claimed in claim 1, comprising radial passages formed respectively in the intermediate shaft and in the hollow shaft, for supplying fluid to at least one of said piston and cylinder means for actuating the associated clutch devices from the centre shaft, a collar mounted on the hollow shaft and acting as a bearing face for the piston actuating said one clutch device, the collar having a hollow portion in a part of the collar adjacent the end of the drum of said one clutch device, the hollow portion defining with the hollow shaft a passage for said fluid.

3. A transmission as claimed in claim 1, wherein at least one drum member has a substantially cylindrical portion and a splined portion of larger diameter than the cylindrical portion and slidably receiving elements of a clutch device, a sleeve being mounted in the cylindrical portion and acting as a bearing face for the piston for actuating the corresponding clutch device.

4. A transmission as claimed in claim 1, comprising, in interposed relation between the hollow shaft and the hub of the freewheel, an intermediate annular member and an extension of the second drum member and which extension is fixed to said second sun gear.

5. A transmission as claimed in claim 1, comprising a conduit in the centre shaft, radial passages in the centre shaft and in the hollow layshaft and radial passages in the hub of the freewheel, said conduit communicating with said passages for supplying lubricating fluid to the transmission.

6. A transmission as claimed in claim 5, comprising a washer connected to an assembly consisting of the freewheel hub and planetary gear carrier, said washer having an inner face defining a chamber with adjacent portions of the free-wheel hub and of the planet gear carrier, a supply passage in the freewheel hub and lubricating conduits in shafts carrying the planet gears communicating with said chamber.

7. A transmission as claimed in claim 1, wherein the freewheel hub and the planet gear carrier have complementary teeth, the teeth of the planet gear carrier being adapted and arranged to allow the assembly of the adjacent sun gear.

8. An automatic hydraulically controlled planetary gear transmission comprising a case, an input shaft and an output shaft coaxial with the input shaft, a planetary gear mechanism comprising two sun gears, planet gears carried by a planet gear carrier and a ring gear connected to the output shaft, a first brake means between said planet gear carrier and the case and actuating means therefor, a first drum member connected to said input shaft, a first hub member integral with or fixed to an intermediate shaft coaxial with said input and output shafts and carrying one of said sun gears, a first clutch device between said first drum member and said first hub member, fluid operated piston and cylinder means for actuating said first clutch device, a second drum member integral with or fixed to a hollow shaft member coaxial with and rotatably mounted on said intermediate shaft and carrying a second of said sun gears, said second drum member extending at least partly around said first drum member, a second clutch device between said first and second drum members, fluid operated piston and cylinder means for actuating said second clutch means, second brake means between said second drum member and said case and a fluid operated piston and cylinder unit for actuating said second brake means, the two drum members, the two clutch devices and said second brake means being disposed concentrically at a first end of the transmission and the planetary gear mechanism and the first brake means being located concentrically at a second end of the transmission, the transmission having a middle part comprising radially from the interior toward the exterior of the transmission : said intermediate shaft, said hollow shaft rotatably mounted on the intermediate shaft, a free wheel device having a freewheel hub rotatably mounted on the hollow shaft and connected to rotate with the planet gear carrier, locking members and a freewheel outer ring, and an annular member integral with or fixed to the transmission case and to said outer ring and at least partly defining the cylinder of the piston and cylinder unit for actuating the said second brake device, said annular member having an U-shaped section defining an inner branch which is integral with the outer ring of the freewheel and an outer branch fixed to the transmission case, said annular member defining two bearing faces for said piston actuating the second brake means.

9. An automatic hydraulically controlled planetary gear transmission comprising a case, an input shaft and an output shaft coaxial with the input shaft, a planetary gear mechanism comprising two sun gears, planet gears carried by a planet gear carrier and a ring gear connected to the output shaft, a first brake means between paid planet gear carrier and the case and actuating means therefor, a first drum member connected to said input shaft, a first hub member integral with or fixed to an intermediate shaft coaxial with said input and output shafts and carrying one of said sun gears, a first clutch device between said first drum member and said first hub member, fluid operated piston and cylinder means for actuating said first clutch device, a second drum member integral with or fixed to a hollow shaft member coaxial with and rotatably mounted on said intermediate shaft and carrying a second of said sun gears, said second drum member extending at least partly around said first drum member, a second clutch device between said first and second drum members, fluid operated piston and cylinder means for actuating said second clutch means, second brake means between said second drum member and said case and a fluid operated piston and cylinder unit for actuating said second brake means, the two drum members, the two clutch devices and said second brake means being disposed concentrically at a first end of the transmission and the planetary gear mechanism and the first brake means being located concentrically at a second end of the transmission, the transmission having a middle part comprising radially from the interior toward the exterior of the transmission : said intermediate shaft, said hollow shaft rotatably mounted on the intermediate shaft, a free wheel device having a freewheel hub rotatably mounted on the hollow shaft and connected to rotate with the planet gear carrier, locking members and a freewheel outer ring, and an annular member integral with or fixed to the transmission case and to said outer ring and at least partly defining the cylinder of the piston and cylinder unit for actuating said second brake device, said annular member having an L-shaped section defining a first bearing face for the associated piston, a second bearing face for the associated piston being defined by an outer face of the outer ring of the freewheel.

10. A transmission as claimed in claim 8, comprising a toothed flange on said annular member, splines in the transmission case engaging said toothed flange, and a shoulder in the transmission case engaging said toothed flange so as to prevent said annular member from rotating and provide an axial abutment for said annular member.

11. A transmission as claimed in claim 9, comprising a toothed flange on said annular member, splines in the transmission case engaging said toothed flange, and a shoulder in the transmission case engaging said toothed flange so as to prevent said annular member from rotating and provide an axial abutment for said annular member.

* * * * *